United States Patent [19]

Sugano

[11] Patent Number: 4,555,964
[45] Date of Patent: Dec. 3, 1985

[54] HYDRAULIC CONTROL SYSTEM FOR AUTOMATIC TRANSMISSION WITH SHOCKLESS 4-3 SHIFTING AS WELL AS SHOCKLESS 2-3 SHIFTING

[75] Inventor: Kazuhiko Sugano, Zama, Japan

[73] Assignee: Nissan Motor Co., Ltd., Yokohama, Japan

[21] Appl. No.: 581,506

[22] Filed: Feb. 17, 1984

[30] Foreign Application Priority Data

Mar. 10, 1983 [JP] Japan .................................. 58-38354

[51] Int. Cl.[4] ...................... B60K 41/08; F16H 57/10
[52] U.S. Cl. ........................................ 74/869; 74/865; 74/758
[58] Field of Search ................ 74/869, 868, 867, 865, 74/759, 758

[56] References Cited

U.S. PATENT DOCUMENTS

| 3,656,373 | 4/1972 | Shimosaki | 74/869 |
|---|---|---|---|
| 3,707,890 | 1/1973 | Ito | 74/868 |
| 3,710,638 | 1/1973 | Sakai | 74/867 X |
| 3,728,915 | 4/1973 | Clark | 74/868 |
| 3,830,258 | 8/1974 | Leach | 137/625.48 |
| 3,896,685 | 7/1975 | Shellman | 74/869 |
| 4,065,985 | 1/1978 | Taga | 74/869 |
| 4,313,354 | 2/1982 | Iwanaga | 74/869 |
| 4,413,536 | 11/1975 | Whitney et al. | 74/869 |
| 4,446,759 | 5/1984 | McCrary | 74/867 |
| 4,467,675 | 8/1984 | Sugano et al. | 74/869 |
| 4,474,084 | 10/1984 | Sugano et al. | 74/869 |
| 4,476,747 | 10/1984 | Kawamoto | 74/869 |

FOREIGN PATENT DOCUMENTS

| 0026925 | 4/1981 | European Pat. Off. . | |
|---|---|---|---|
| 84101803 | 8/1984 | European Pat. Off. . | |
| 0047038 | 4/1980 | Japan | 74/868 |
| 0131458 | 8/1983 | Japan | 74/869 |
| 2108604 | 5/1983 | United Kingdom | 74/869 |

Primary Examiner—Leslie A. Braun
Assistant Examiner—Stephen B. Andrews
Attorney, Agent, or Firm—Schwartz, Jeffery, Schwaab, Mack, Blumenthal & Evans

[57] ABSTRACT

Disclosed herein is a hydraulic control system wherein under the control of a servo release changeover valve 23, a line pressure is supplied to a servo release fluid chamber (S/R) for a brake (B2) via a first flow path (434-435-437-444) at a flow rate determined by an orifice (616) during 2-3 shifting, and via a second flow path (412-435-437-444) at a flow rate determined by an orifice (617) during 4-3 shifting.

1 Claim, 6 Drawing Figures

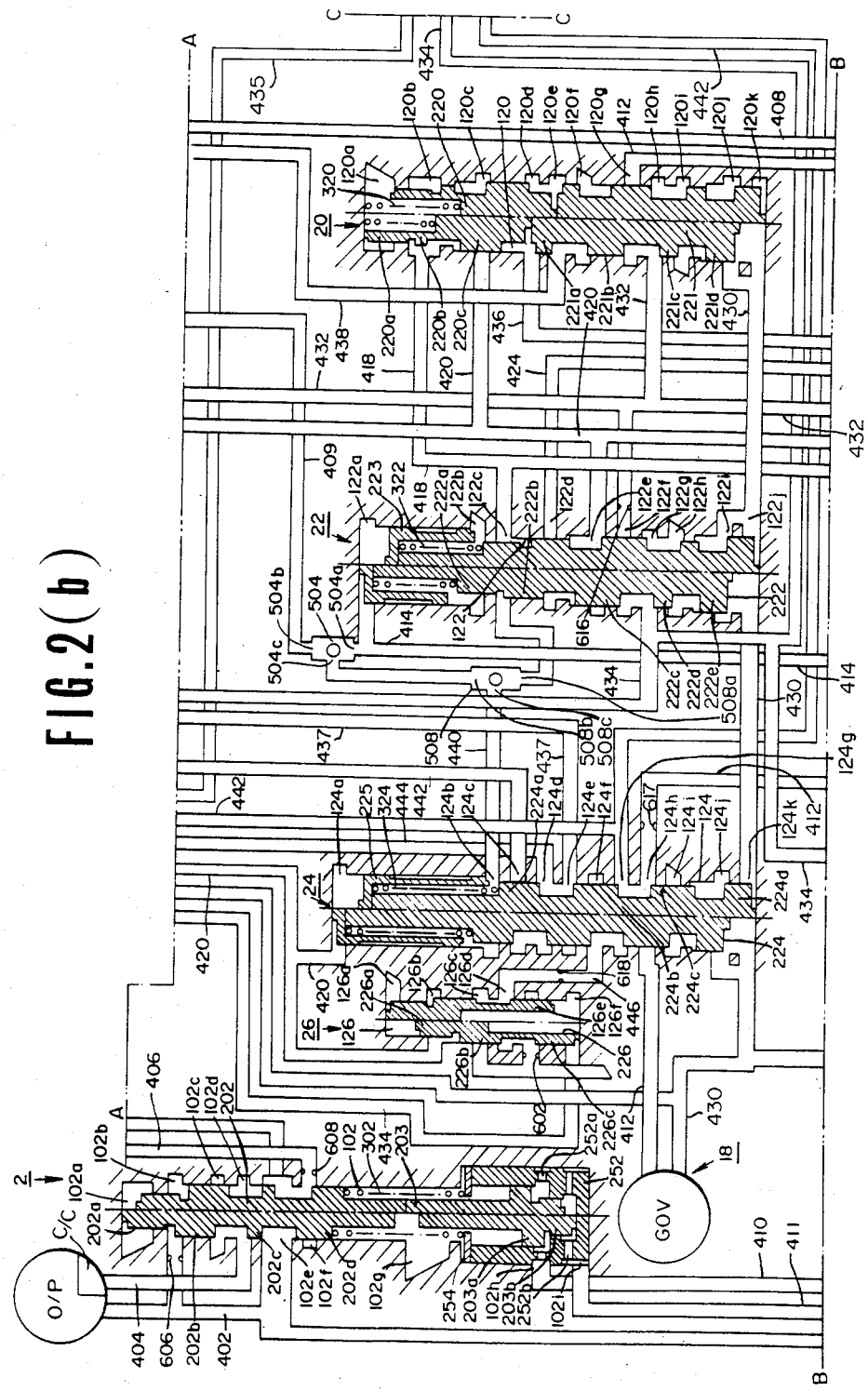

HYDRAULIC CONTROL SYSTEM FOR AUTOMATIC TRANSMISSION WITH SHOCKLESS 4–3 SHIFTING AS WELL AS SHOCKLESS 2–3 SHIFTING

CROSS-REFERENCES TO RELATED APPLICATIONS

References are made to the following related copending applications, filed by the same applicant as that of the present application; U.S. patent application Ser. No. 494,647, filed May 16, 1983 (our ref.: U027-83); U.S. patent application Ser. No. 507,228, filed June 23, 1983 (our ref.: U028-83); U.S. patent application Ser. No. 518,413, filed July 29, 1983 (our ref.: U054-83); U.S. patent application Ser. No. 518,540, filed July 29, 1983 (our ref.: 057-83); U.S. patent application Ser. No. 518,681, filed July 29, 1983 (our ref.: U058-83); U.S. patent application Ser. No. 518,745, filed July 29, 1983 (our ref.: U055-83); and U.S. patent application Ser. No. 518,746, filed July 29, 1983 (our ref.: U056-83).

References are also made to the following related applications, each filed by the same applicant as that of the present application and concurrently with the present application: U.S. patent application Ser. No. 581,507 (our ref.: U097-83); U.S. patent application Ser. No. 581,508 (our ref.: U100-83); and U.S. patent application Ser. No. 581,509 (our ref.: 107-83).

BACKGROUND OF THE INVENTION

The present invention relates to a hydraulic control system for an automatic transmission.

Automatic transmissions are known wherein one friction unit is engaged and another friction unit is disengaged to effect a shifting between speed ratios, i.e., between drive ratios. In operating such automatic transmissions, if the engagement of the one friction unit does not take place in good timed relationship with the disengagement of another friction unit, substantial shocks will take place or an engine will be raced. Particularly, in the case where the same friction unit must be actuated not only during an upshifting but also during a downshifting, it is necessary to actuate the friction unit in different timings optimum for the upshifting and downshifting, respectively. In a known four speed automatic transmission, a brake must be released in timed relationship with the engagement of a first clutch during 2–3 shifting, while the same brake must be released in timed relationship with the engagement of a second clutch during 4–3 shifting. For optimum shifting, it is desirable to supply fluid pressure chambers of the brake and the first clutch with fluid pressure via a common orifice for 2–3 shifting and to supply fluid chambers of the same brake and the second clutch with fluid pressure via another common orifice for 4–3 shifting. This is because it is preferred that the engagement of the clutch and the release of the brake take place almost at the same time so as to provide the appropriate engagement and release timing by supplying the oil pressure via the common orifice.

SUMMARY OF THE INVENTION

According to the present invention, there is provided a hydraulic control system for an automatic transmission which to provides at least three forward speed ratios and shiftable to a n+2 th speed ratio, a n+1 th speed ratio and a n th speed ratio, the automatic transmission including a first, a second and a third friction units, the n+2 th speed ratio being established when fluid pressure is supplied to a fluid chamber of the first friction unit and fluid pressure is discharged from both fluid chambers of the second and third friction units, the n+1 th speed ratio being established when fluid pressure is supplied to all fluid chambers of the first, second and third friction units, and the n th speed ratio being established when fluid pressure is supplied to the third friction unit and fluid pressure is discharged from fluid chambers of the first and second friction units.

the hydraulic control system comprising:

means for generating an actuating fluid pressure;

means defining a first fluid conduit connected to the fluid chamber of the first friction unit;

means defining a second fluid conduit connected to the fluid chamber of the third friction unit;

a changeover valve having a first position wherein the first fluid conduit is allowed to communicate with the fluid chamber of the second friction unit and a second position wherein the second fluid conduit is allowed to communicate with the fluid chamber of the second friction unit, the changeover valve assuming the first position thereof when the first fluid conduit is supplied with fluid pressure, the changeover valve assuming the second position thereof when the second fluid conduit is supplied with fluid pressure;

means for supplying the actuating fluid pressure to the first fluid conduit at a first predetermined flow rate in shifting from the n th speed ratio to the n+1 th speed ratio; and means for supplying the actuating fluid pressure to the second fluid conduit at a second predetermined flow rate in shifting from the n+2 th speed ratio to the n+1 th speed ratio.

An object of the present invention is to improve an automatic transmission wherein one friction unit is actuated during a shifting from a n th speed ratio to a n+1 th speed ratio and also during a shifting from a n+2 th speed ratio to the n+1 th speed ratio by providing a hydraulic control system wherein fluid pressure is supplied to this friction unit via different fluid flow paths so as to actuate the friction unit at different timings which are optimum for the two shiftings, respectively, where, n is a positive integer.

BRIEF DESCRIPTION OF THE DRAWINGS

FIGS. 2(a), 2(b), 2(c) and 2(d), when combined, illustrate an embodiment of a hydraulic control system for the automatic transmission according to the present invention.

DETAILED DESCRIPTION OF THE INVENTION

Figure 1:
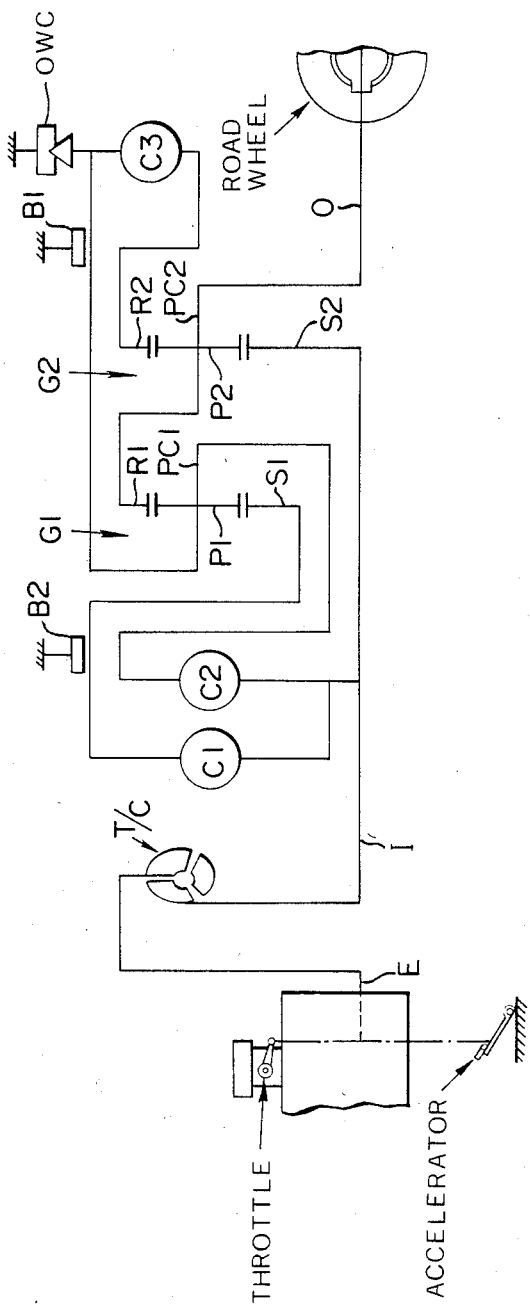
FIG. 1 is a schematic view of a power transmission mechanism of a four speed automatic transmission as illustrated with an engine having a throttle and an accelerator.

Referring to FIG. 1, there is illustrated a power transmission mechanism of a four forward speed and one reverse speed automatic transmission having an overdrive. This power transmission mechanism comprises an input shaft I operatively connected via a torque converter T/C to an engine output shaft E of an engine which has a throttle which opens in degrees, an output shaft O operatively connected to road wheels, only one being shown, via a final drive, not shown. A first planetary gear set G1 and a second planetary gear set G2 are connected between the input and output shafts I and O. A plurality of fluid operated friction units are provided which are made operative and inoperative for producing a plurality of speed ratios between the input shaft I and output shaft O. The fluid operated friction units include a first clutch C1, a second clutch C2, a third clutch C3, a first brake B1, a second brake B2, and a one-way clutch OWC. The first planetary gear set G1 comprises a sun gear S1, an internal gear R1, a carrier PC1 carrying pinion gears P1 meshing simultaneously both the gears S1 and R1. The planetary gear set G2 comprises a sun gear S2, an internal gear R2 and a carrier PC2 carrying pinion gears P2 meshing simultaneously both gears S2 and R2. The carrier PC1 is connectable via the clutch C1 with the input shaft I, and the sun gear S1 is connectable via the clutch C2 with the input shaft I. The carrier PC1 is connectable via the clutch C3 with the internal gear R2. The sun gear S2 is constantly connected with the input shaft I. The internal gear R1 and carrier PC2 are constantly connected with the output shaft O. The brake B1 is arranged to anchor the carrier PC1. The brake B2 is arranged to anchor the sun gear S1. The one-way clutch OWC is so constructed that it allows forward rotation (i.e., the same rotation as that of the engine output shaft E), but prevents reverse rotation (i.e., the rotation opposite to the forward rotation). Thus, it acts as a brake only during reverse rotation.

In the above-mentioned power transmission mechanism, the rotational state of each of the rotary elements (S1, S2, R1, R2, PC1, and PC2) of the planetary gear sets G1 and G2 can be varied by actuating selected one or combination of the clutches C1, C2 and C3, brake B1, (one-way clutch OWC) and brake B2, thus varying the revolution speed of the output shaft O relative to that of the input shaft I. The four forward speed ratios and one reverse speed ratio are produced if the clutches C1, C2 and C3 and brakes B1 and B2 are engaged in the manner as shown in the following Table.

TABLE

| | C1 | C2 | C3 | B1 (DWC) | B2 | Gear Ratio | $\alpha 1 = 0.45$ $\alpha 2 = 0.45$ |
|---|---|---|---|---|---|---|---|
| 1st speed | | | o | o | | $\frac{1 + \alpha 2}{\alpha 2}$ | 3.22 |
| 2nd speed | | | o | | o | $\frac{\alpha 1 + \alpha 2}{\alpha 2(1 + \alpha 1)}$ | 1.38 |
| 3rd speed | o | o | | | | 1 | 1 |
| 4th speed | | o | | | o | $\frac{1}{1 + \alpha 1}$ | 0.69 |
| Reverse | o | | | | o | $-\frac{1}{\alpha 1}$ | −2.22 |

In the above Table, a sign "o" denotes actuation state of the clutch or brake, $\alpha 1$ and $\alpha 2$ respectively denote ratios of number of teeth of the internal gears R1 and R2 to number of teeth of the corresponding sun gears S1 and S2. A gear ratio is a ratio of the revolution number of the input shaft I to that of the output shaft O. What is denoted by the label (OWC) below the brake B1 means that the first speed ratio is produced owing to the action of the one-way clutch OWC even if the brake B1 is not applied. However, in this first speed ratio, it is not possible for the output shaft O to drive the engine (that is, no engine braking is effected).

Referring to FIGS. 2(a), 2(b), 2(c) and 2(d), a hydraulic control system for the above power transmission mechanism is described.

This hydraulic control system comprises a regulator valve 2, a manual valve 4, a throttle valve 6, a throttle fail safe valve 8, a throttle modulator valve 10, a pressure modifier valve 12, a cut back valve 14, a line pressure booster valve 16, a governor valve 18, a 1-2 shift valve 20, a 2-3 shift valve 22, a servo release change-over valve 23, a 3-4 shift valve 24, a 2-4 timing valve 26, a 2-3 timing valve 28, a 3-4 timing valve 30, a 3-2 timing valve 32, a first manual range pressure reducing valve 34, a torque converter pressure reducing valve 36, a 1-2 accumulator 38, a 4-3 accumulator 40, and an overdrive inhibitor solenoid 42. These valves are interconnected as shown in FIGS. 2(a), 2(b), 2(c) and 2(d), and connected with an oil pump O/P, the torque converter T/C. clutches C1, C2, C3 and brakes B1, B2 as shown. The brake B2 has a servo apply chamber S/A, i.e., an oil pressure chamber designed to apply the brake when pressurized, and a servo release chamber S/R, i.e., an oil pressure chamber designed to release the brake when pressurized. Since the servo release chamber S/R has a larger pressure acting area than a pressure acting area of the servo apply chamber S/A, the brake B2 is released when the pressure is supplied to the servo release chamber S/R irrespective of the supply of oil pressure to the servo apply chamber S/A. The overdrive inhibitor solenoid 42 is electrically connected with an overdrive inhibitor switch SW.

The hydraulic control system is substantially the same as a prior proposed hydraulic control system disclosed in copending U.S. patent application Ser. No. 518,413, filed on July 29, 1983, by Kazuhiko Sugano (our ref.: U054-83). This copending application is incorporated hereby by reference in its entirety. Particulary, attention is directed to FIG. 2(a), 2(b) and 2(c) and the description along therewith.

The hydraulic control system of the present application is different from the prior proposed hydraulic control system in that a servo release chamber S/R is selectively connectable with a first oil conduit 434 leading to the clutch C2 or a second oil conduit 442 leading to the clutch C3 and an orifice 617 is provided in an oil conduit 412 near a port 124h of the 3-4 shift valve 24 as opposed to the prior proposed hydraulic control system wherein the servo release chamber S/R for the brake B2 is connectable with the first oil conduit 434 only.

Figure 2A:
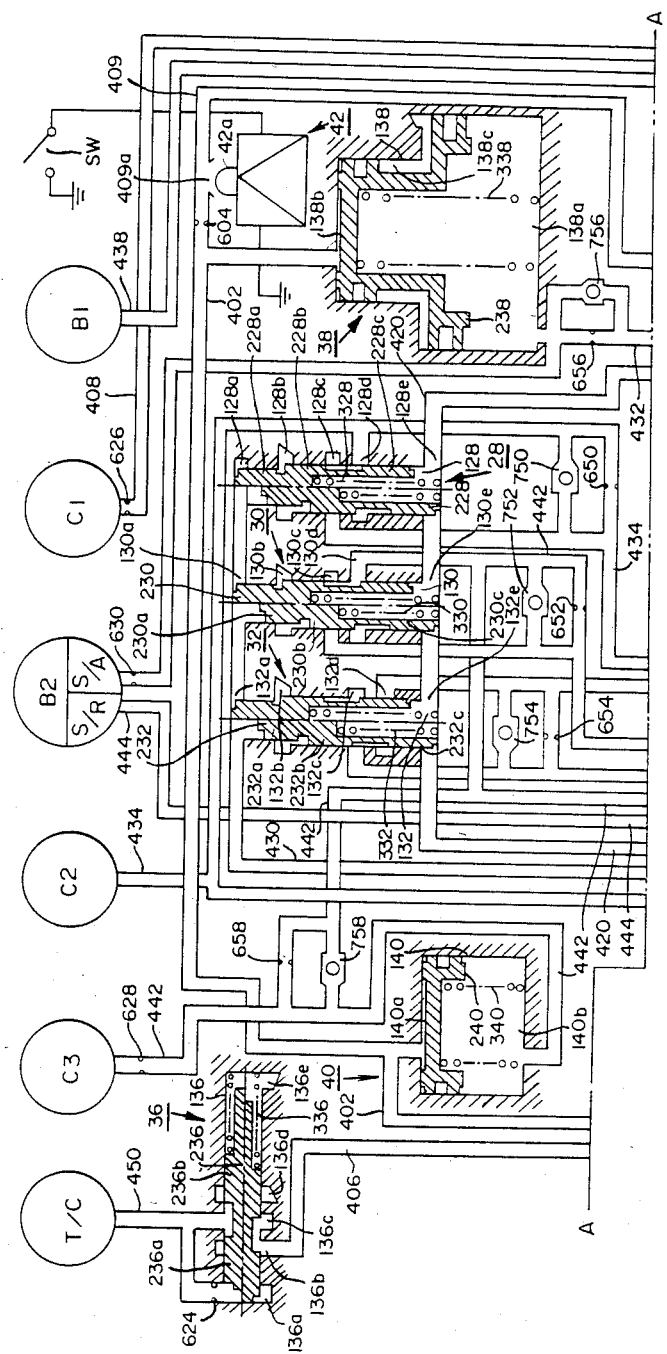
Figure 2C:
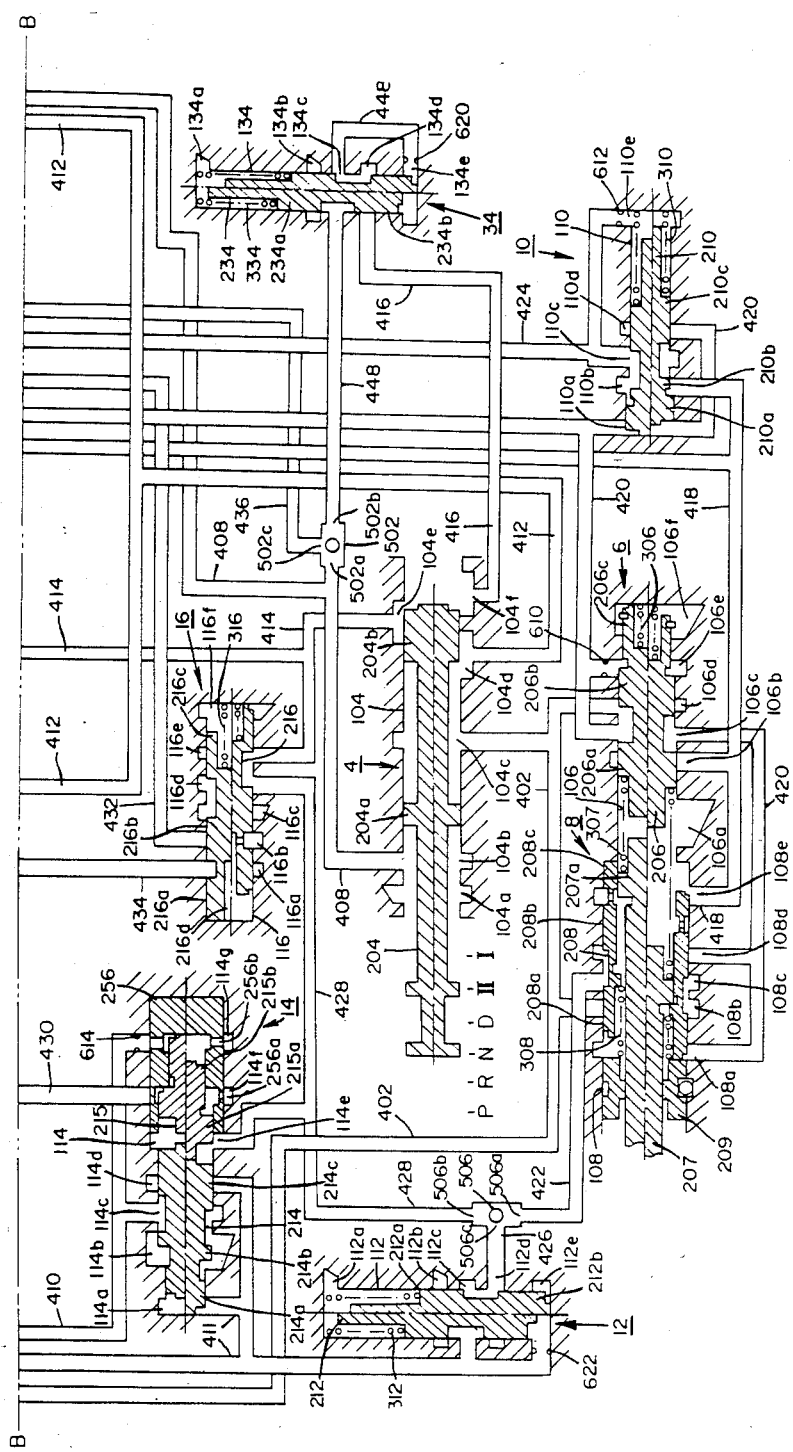
Figure 2D:
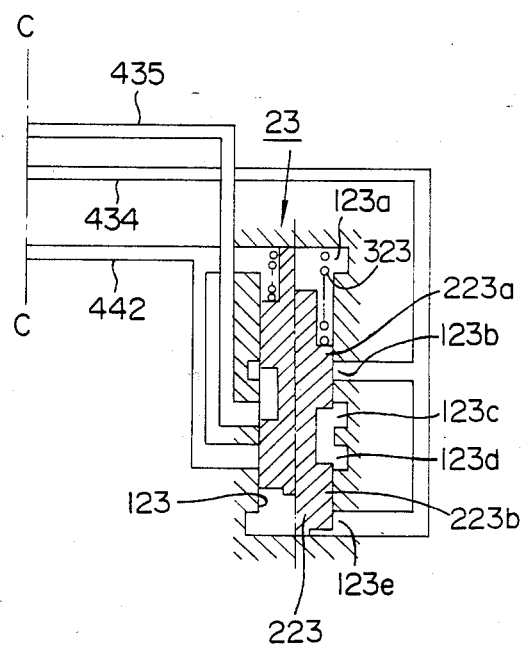

Referring to FIG. 2(d), the servo release changeover valve 23 comprises a valve bore 123 formed with five ports 123a to 123e, a spool 223 having formed thereon two lands 23a, and 223b slidably disposed in the valve bore 123, and a spring 323 biasing the spool 223 downward as viewed in FIG. 2(d).

Figure 3:
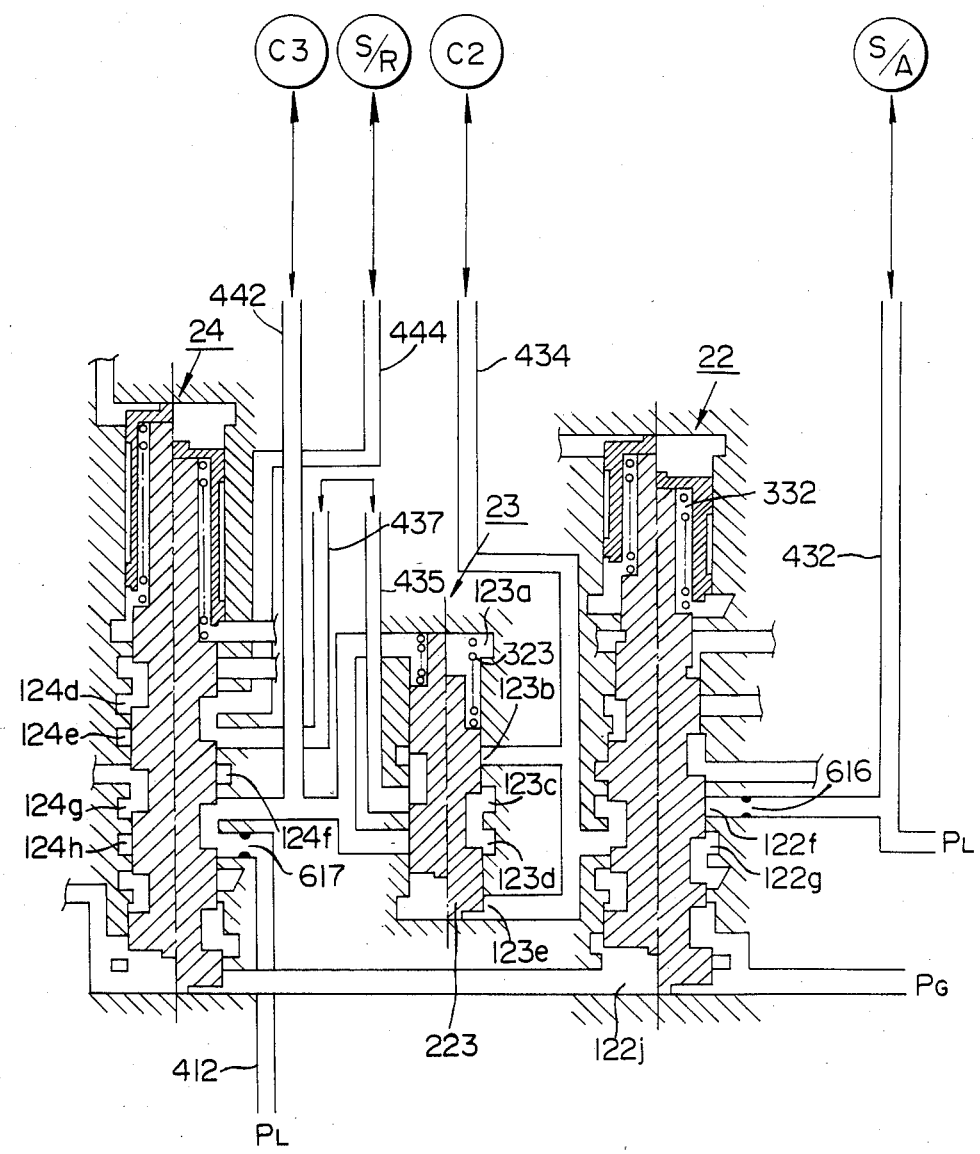
FIG. 3 is a diagram illustrating the embodiment shown in FIGS. 2(a), 2(b), 2(c) and 2(d) in a simplified manner.

For ease of understanding the feature of the present invention, the following description proceeds along with FIG. 3 wherein the servo release changeover valve 23 is illustrated with the 2-3 shift valve 22 and the 3-4 shift valve 24.

As shown in FIG. 3, the port 122f of the 2-3 shift valve 22 is connected via an orifice 616 with an oil conduit 432 which is supplied with the line pressure when the 1-2 shift valve (not shown in FIG. 3) assumes the upshift position thereof. The port 122f of the 2-3 shift valve 22 is allowed to communicate with the port 122g when the 2-3 shift valve 22 assumes the upshift position thereof (as indicated by the left half thereof as viewed in FIG. 3). This port 122g is connected via an oil conduit 434 with the clutch C2. The port 124h of the 3-4 shift valve 24 is connected via an orifice 617 with an oil conduit 412 which is supplied with the line pressure during forward drive ranges, and this port 124h is allowed to communicate with a port 124g when the 3-4 shift valve 24 assumes the downshift position thereof (as indicated by the right half thereof as viewed in FIG. 3). This port 124g is connected via an oil conduit 442 with the clutch C3. The ports 124d and 124e of the 3-4 shift valve 24 are allowed to communicate with each other when the 3-4 shift valve 24 assumes the downshift position thereof. The port 124d is connected via the oil conduit 444 with the servo release chamber S/R, while the port 124e is connected with an oil conduit 437. The ports 123a and 123d of the servo release changeover valve 23 are connected with the before mentioned oil conduit 442, the ports 123b and 123e are connected with the before mentioned oil conduit 434, and the port 123c is connected with the oil conduit 435 communicating with the before mentioned oil conduit 437.

Next, the operation is described.

First, the operation during 2-3 shifting is described. During operation with the 2nd speed ratio, the 1-2 shift valve 20 not shown in FIG. 3 assumes the upshift position thereof and the line pressure is supplied to the oil conduit 432. Therefore, the line pressure is supplied to the servo apply chamber S/A. The 3-4 shift valve 24 assumes the downshift position, too, as indicated by the right half thereof as viewed in FIG. 3, supplying the line pressure in the oil conduit 412 to the clutch C3 via the port 124h, port 124g and oil conduit 442. Thus, the 2nd speed ratio is established wherein the clutch C3 and brake B2 are engaged. In this state, when the 2-3 shift valve 22 shifts from the down position thereof to the up position thereof, the ports 122f and 122g are allowed to communicate with each other, thus supplying the line pressure in the oil conduit 432 to the oil conduit 434 via the orifice 616. This causes the clutch C2 to be engaged. Simultaneously, the servo release changeover valve 23 shifts from the down position thereof as indicated by the right half thereof as viewed in FIG. 3 to the up position thereof as indicated by the left half thereof as viewed in FIG. 3. This allows the ports 123b and 123c to communicate with each other, allowing the line pressure in the oil conduit 434 to be supplied to the oil conduit 435 and then to the servo release chamber S/R via oil conduit 437, port 124e, port 124d and oil conduit 444. This results in the release of the brake B2. As a result, the 3rd speed ratio is established owing to the engagement of the clutches C2 and C3. During the above action, the oil pressure supplied to the clutch C2 and that supplied to the servo release chamber S/R passes through the common orifice 616. Therefore, the clutch C2 is engaged simultaneously with the release of the brake B2 because the oil pressure in the servo release chamber S/R and that in the clutch C2 are substantially the same.

Next, the operation during 4-3 shifting is described. During operation with the 4th speed ratio, the 2-3 shift valve 22 and 3-4 shift valve 24 assume the upshift positions thereof as indicated by the left halves thereof as viewed in FIG. 3. Thus, the oil pressure in the oil conduit 432 is supplied to the servo apply chamber S/A and the oil pressure in the oil conduit 434 is supplied to the clutch C2, establishing the 4th speed ratio wherein the brake B2 and clutch C2 are engaged. Although the oil pressure in the oil conduit 34 is supplied, via the ports 123b and 123c of the servo release changeover valve 23, oil conduits 435 and 437, to the port 124e of the 3-4 shift valve 24, the port 124e is closed by the 3-4 shift valve 24 which stays in the upshift position thereof, thus preventing the supply of oil pressure to the servo release chamber S/R. In this state, when the 3-4 shift 24 shifts from the upshift position thereof as indicated the left half thereof as viewed in FIG. 3 to the downshift position thereof as indicated by the right half thereof as viewed in FIG. 3, the port 124g is allowed to communicate with the port 124h. This causes the line pressure in the oil conduit 412 to be supplied to the oil conduit 442 via the orifice 617. This results in the engagement of the clutch C3. At the same time, the oil pressure in the oil conduit 442 acts in the port 123a of the servo release changeover valve 23, urging it to shift from the up position thereof as indicated by the left half thereof as viewed in FIG. 3 to the down position thereof as viewed in FIG. 3. (Although oil pressure acts in the port 123e also, the servo release changeover valve 23 shifts to the down position owing to the action of the spring 323 when oil pressure starts acting in the port 23a.) This causes the port 123c to communicate with the port 123d, thus allowing the line pressure in the oil conduit 442 to be supplied to the oil conduit 435. The oil pressure in the oil conduit 435 is supplied, via the oil conduit 437, ports 124a and 124d of the 3-4 shift valve 24 and oil conduit 444, to the servo release chamber S/R. This results in the release of the brake B2. As a result, the 3rd speed ratio wherein the clutches C2 and C3 are engaged is established. During the above action, the oil pressure supplied to the clutch C3 and the servo release chamber S/R is supplied from the oil conduit 412 via the common orifice 617. Therefore, substantially the same oil pressure acts in the clutch C3 and in the servo release chamber S/R, allowing the clutch C3 to be engaged simultaneously with the release of the brake B2. Accordingly, the engagement of the clutch C3 is effected always in optimum timed relationship with the release of the brake B2.

In other words, the oil pressure is supplied via the orifice 616 to the clutch C2 and the servo release chamber S/R during 2-3 shifting, while the oil pressure is supplied via the orifice 617 to the clutch C3 and servo release chamber S/R during 4-3 shifting. As a result, the engagement of the clutch is effected always in the optimum timed relationship with the release of the brake in each of the shiftings.

It will now be understood from above description that the oil pressure is supplied to the servo release chamber S/R for the brake B2 via the first flow path 434-435-437-444 at the flow rate determined by the orifice 616 during 2-3 shifting and via the second flow path 412-442-435-437-444 at the flow rate determined by the orifice 617 during 4-3 shifting.

I claim:

1. A hydraulic control system for an automatic transmission which provides at least three forward speed ratios and shiftable to a n+2 th speed ratio, a n+1 th speed ratio and a n th speed ratio, the automatic transmission including a first, a second and a third friction units, the n+2 th speed ratio being established when fluid pressure is supplied to a fluid chamber of the first friction unit and fluid pressure is discharged from both fluid chambers of the second and third friction units, the n+1 th speed ratio being established when fluid pressure is supplied to all fluid chambers of the first, second and third friction units, and the n th speed ratio being established when fluid pressure is supplied to the third friction unit and fluid pressure is discharged from fluid chambers of the first and second friction units, the hydraulic control system comprising:

means for generating an actuating fluid pressure;

means defining a first fluid conduit connected to the fluid chamber of the first friction unit;

means defining a second fluid conduit connected to the fluid chamber of the third friction unit;

a changeover valve having a first position wherein said first fluid conduit is allowed to communicate with the fluid chamber of the second friction unit and a second position wherein said second fluid conduit is allowed to communicate with the fluid chamber of the second friction unit, said changeover valve assuming the first position thereof when the first fluid conduit is supplied with fluid pressure, said changeover valve assuming the second position thereof when said second fluid conduit is supplied with fluid pressure;

means for supplying the actuating fluid pressure to said first fluid conduit at a first predetermined flow rate in shifting from the n th speed ratio to the n+1 th speed ratio; and means for supplying the actuating fluid pressure to said second fluid conduit at a second predetermined flow rate in shifting from the n+2 th speed ratio to the n+1 th speed ratio.

* * * * *